US007427182B2

(12) United States Patent
Galijan

(10) Patent No.: US 7,427,182 B2
(45) Date of Patent: Sep. 23, 2008

(54) AGITATOR LOADING SYSTEM

(75) Inventor: Michael N. Galijan, Keilor (AU)

(73) Assignee: Intray Consolidated Pty Ltd, Keilor (AU)

( * ) Notice: Subject to any disclaimer, the term of this patent is extended or adjusted under 35 U.S.C. 154(b) by 451 days.

(21) Appl. No.: 11/001,253

(22) Filed: Dec. 1, 2004

(65) Prior Publication Data

US 2006/0120209 A1 Jun. 8, 2006

(51) Int. Cl.
*B65G 65/30* (2006.01)
*B65G 69/18* (2006.01)
*B65B 1/28* (2006.01)

(52) U.S. Cl. ......................... 414/291; 414/397; 141/86; 141/263

(58) Field of Classification Search ................... 366/68, 366/48; 141/93, 86, 263; 193/2 R, 13, 20, 193/21, 31 R, 3; 414/291, 397
See application file for complete search history.

(56) References Cited

U.S. PATENT DOCUMENTS 1,492,937 A * 5/1924 Wilson ....................... 110/171
1,534,893 A * 4/1925 Beaumont et al. ............. 193/21
2,142,236 A * 1/1939 Campbell ..................... 193/20
3,707,998 A * 1/1973 Dalrymple .................... 141/93
3,812,889 A * 5/1974 Strehlow ..................... 141/93
3,868,238 A * 2/1975 Mills et al. ..................... 141/93
4,420,285 A * 12/1983 Loyer et al. .................... 141/93
5,190,132 A * 3/1993 Stanelle et al. ................ 193/30
5,238,035 A * 8/1993 Poussin et al. ................ 141/93
5,302,071 A * 4/1994 Binzen ....................... 414/376
5,332,012 A * 7/1994 Svendsen ..................... 141/93
5,345,982 A * 9/1994 Nadeau et al. ................ 141/93
6,065,922 A * 5/2000 Kato et al. .................... 141/93
6,491,070 B1 * 12/2002 Espina Frutos .............. 141/93
6,499,929 B1 * 12/2002 Salgado et al. .............. 414/328

* cited by examiner

*Primary Examiner*—Tony G Soohoo
(74) *Attorney, Agent, or Firm*—Westman, Champlin & Kelly, P.A.

(57) ABSTRACT

An agitator loading system for loading mixture ingredients, the system includes a loading bay, a delivery chute for delivering mixture ingredients from a storage area, and a dust containment apparatus for minimizing the dust dispersion during agitator loading. A method for loading an agitator from an agitator loading system is also described.

21 Claims, 6 Drawing Sheets

AGITATOR LOADING SYSTEM

FIELD OF THE INVENTION

The present invention relates to an agitator loading system. Particularly, the present invention relates to the loading of mixture ingredients into an agitator at a concrete batching plant.

BACKGROUND OF THE INVENTION

Concrete batching plants must adhere to strict statutory requirements regarding the control of environmental conditions. One area that requires particular attention is the loading of mixture ingredients, for use in making concrete, into an agitator.

The mixture ingredients of concrete typically include aggregate, such as sand and gravel, cement and water. Each ingredient is separately stored and delivered to a gob hopper, which feeds the mixture into the loading inlet of an agitator. The loading of the agitator occurs in a loading bay, which is enclosed on three sides, such that the agitator is reversed into the bay. The enclosed loading bay is designed to reduce the amount of dust emission into the surrounding environment. When loading is finished, the agitator truck drives out to allow another agitator to reverse in. As the loading bay is enclosed on three sides, any material or water spilt during the loading process is contained within the loading bay, to be cleaned out periodically.

The agitator loading system in current concrete batching plants is slow, resulting in slow batching times as well as traffic management and agitator maneuverability concerns. Dust emission out of the open end of the loading bay is a problem, as is noise emission. There is a large amount of spillage and waste of the ingredients and water, thus the loading bay needs to be constantly cleaned.

It would be desirable to provide an agitator delivery system that alleviates or overcomes one or more problems associated with known systems.

SUMMARY OF THE INVENTION

The present invention provides an agitator loading, including a loading bay, a delivery chute for delivering mixture ingredients from a storage area, and a dust containment apparatus for minimizing dust dispersion during agitator loading.

Preferably, the delivery chute is movable between a retracted position and at least one extended position. The delivery chute may extend between the storage area and an inlet on the agitator, when in the extended position. The delivery chute can have two extended positions, or more than two, which positions the delivery chute at variable heights below the storage area. This variable height delivery chute allows agitators of different heights to all use the one agitator loading system.

The system may include a drip tray. The drip tray is preferably moveable between an extended position beneath the delivery chute and a retracted position during agitator loading.

Advantageously, the dust containment apparatus includes a door for closing one end of the loading bay. Alternatively, two doors may be included for closing both ends of the loading bay. The dust containment apparatus may also include a dust hood. The dust hood is preferably moveable between a retracted position and a lowered position for minimizing dust dispersion during agitator loading. Advantageously, the dust hood extends below the agitator inlet when in the lowered position. The dust containment apparatus may also include an extractor. The inlets of the extractor are preferably located within the dust hood when the dust hood is lowered.

An embodiment of the present invention provides a method for loading an agitator from an agitator loading system, as described above. The method includes the steps of driving the agitator into the loading bay for positioning an inlet on the agitator beneath the delivery chute, extending the delivery chute towards the agitator inlet, causing the dust containment apparatus to be placed into a dust containment configuration, and loading the agitator through the delivery chute into the agitator inlet.

The step of extending the delivery chute may include moving the delivery chute from a retracted position to at least one extended position.

The system may include a drip tray, whereby the drip tray is retracted from beneath the delivery chute before the delivery chute is extended.

The dust containment apparatus may include a door, whereby the step of effecting operation of the dust containment apparatus may include the step of lowering the door once the agitator inlet is placed in position beneath the delivery chute. The dust containment apparatus may also include a dust hood, whereby the step of effecting operation of the dust containment apparatus may include the step of lowering the dust hood once the agitator inlet is placed in position beneath the delivery chute. The dust hood may be extended below the agitator inlet.

The dust containment apparatus may also include an extractor, whereby the step of causing the dust containment apparatus to be placed into a dust containment configuration includes the step of activating the extractor.

BRIEF DESCRIPTION OF THE DRAWINGS

The invention will now be described, by way of example only, with reference to the accompanying drawings, in which.

DETAILED DESCRIPTION OF ILLUSTRATIVE EMBODIMENTS

Figure 1:
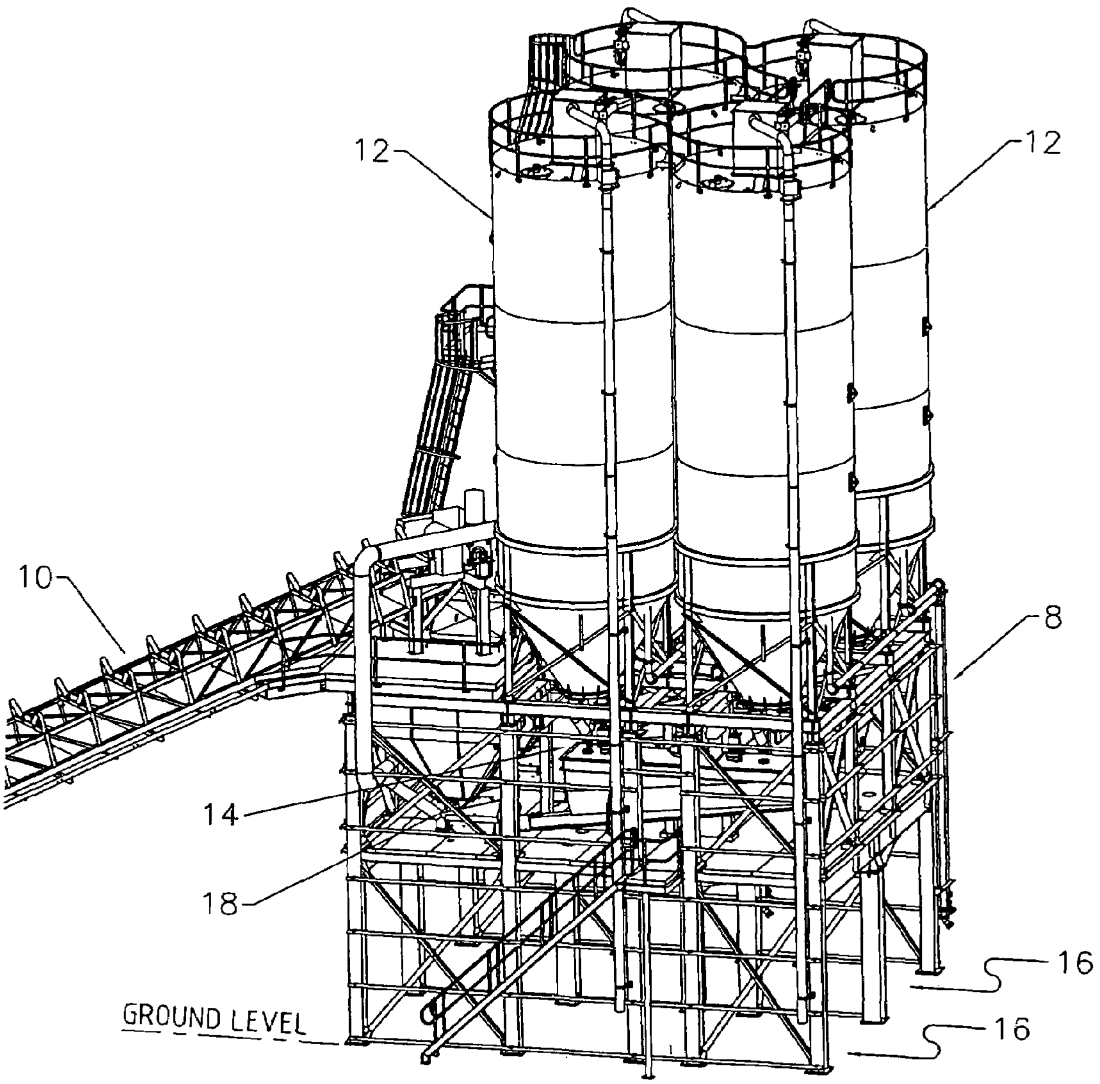
FIG. 1 shows a perspective view of a batching area and silo structure, which houses an agitator loading system according to the present invention.

FIG. 1 shows a perspective view of part of a concrete batching plant. Aggregate is delivered to a storage area 8 via a conveyor 10. Cement is stored in silos 12 and water is stored in water tank 14. Aggregate, cement and water are mixture ingredients that are delivered to a gob hopper 18 within the storage area 8. Beneath silos 12 are two loading bays 16, although any number of loading bays 16 could be incorporated in other embodiments of the invention.

Figure 2:
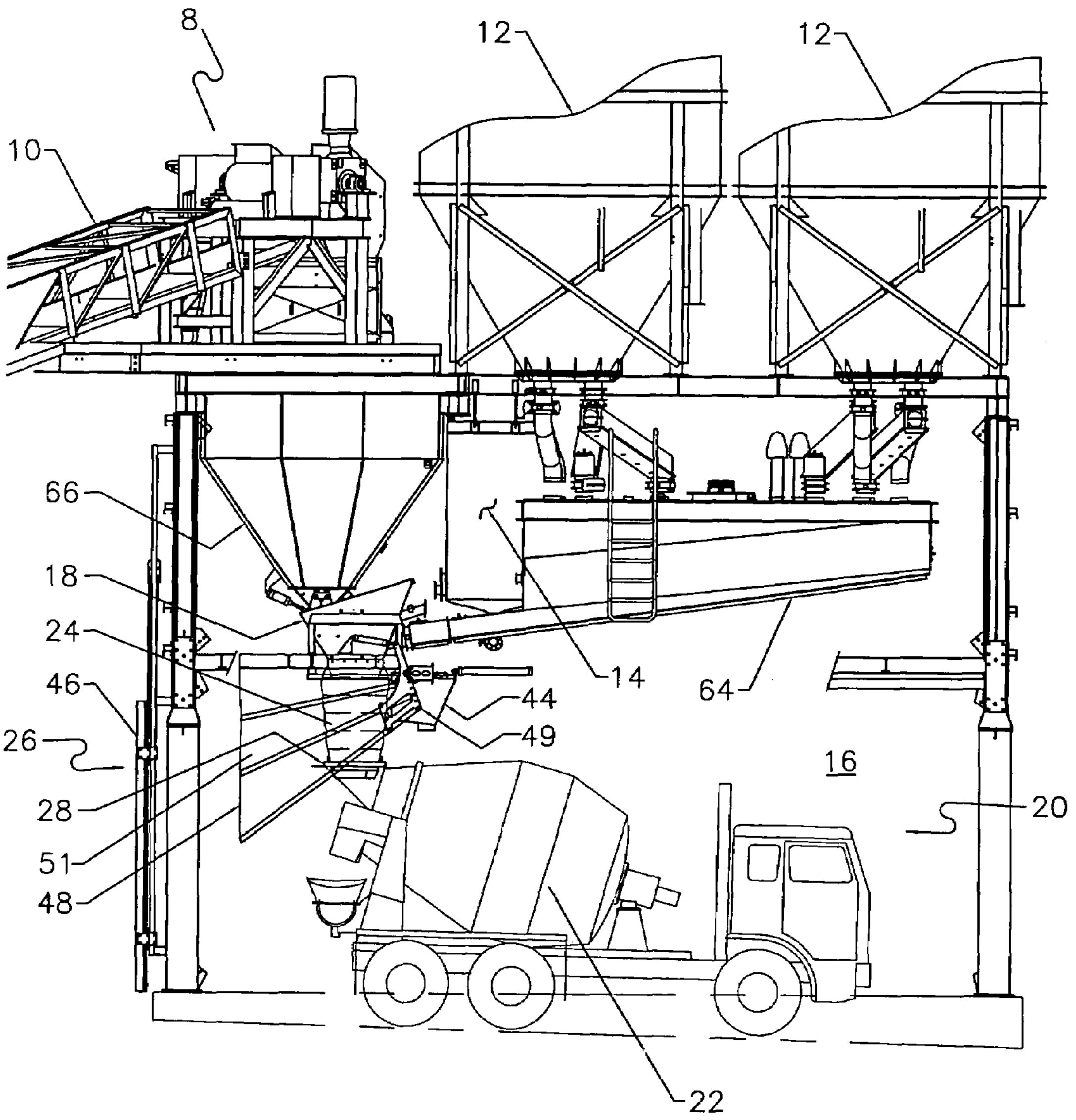
FIG. 2 shows a side view of the agitator loading system according to one embodiment of the present invention.

An agitator loading system 20 is shown in FIG. 2. The agitator loading system 20 is used for loading mixture ingredients into an agitator 22. The system 20 includes a loading bay 16, a delivery chute 24 and a dust containment apparatus 26. Loading bay 16 includes two side walls, with open ends that allow an agitator to drive through the loading bay 16, improving traffic flow over known systems. The delivery chute 24 delivers mixture ingredients from the gob hopper 18 to an inlet 28 on the agitator 22. The dust containment apparatus 26 minimizes the dust dispersion during loading of agitator 22.

Figure 4:
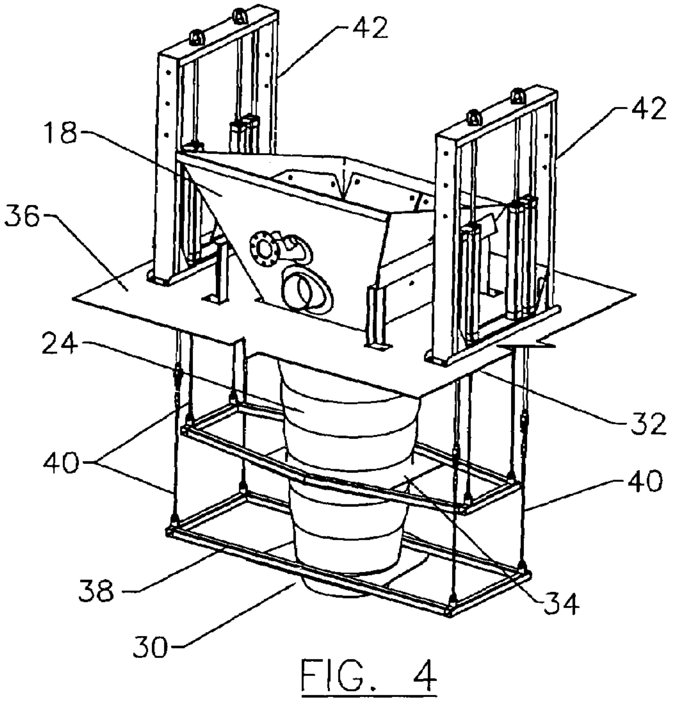
FIG. 4 shows a perspective view of a delivery chute.
Figure 5:
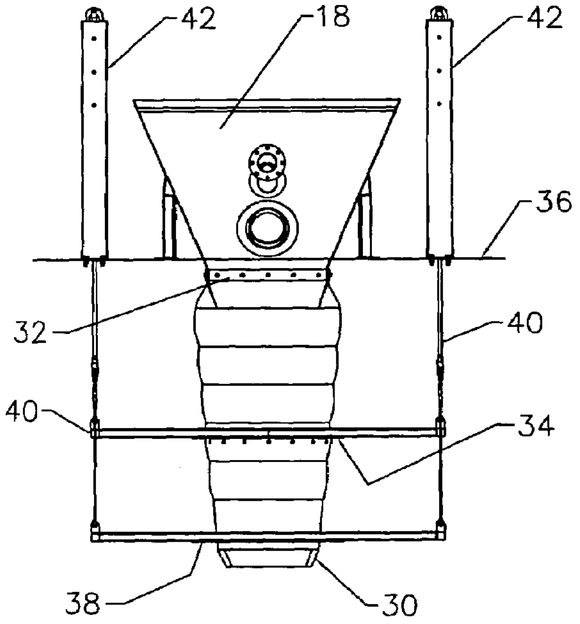
FIG. 5 shows a front view of the delivery chute of FIG. 4.
Figure 6:
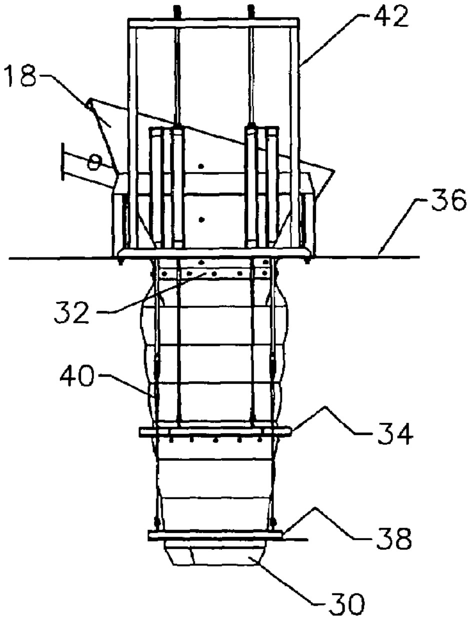
FIG. 6 shows a side view of the delivery chute of FIG. 4.

The delivery chute 24 is shown in FIGS. 4 to 6. Delivery chute 24 is attached to the bottom of gob hopper 18 and is in the form of a tubular rubber sock. Delivery chute 24 can be moved between a retracted position and a number of extended positions. In the retracted position, the bottom 30 of delivery chute 24 is positioned against the top 32 of delivery chute 24. The retracted position allows the agitator 22 to be driven underneath the delivery chute 24 and the inlet 28 to be positioned in line with the delivery chute 24. The delivery chute 24 has two extended positions, the fully extended position shown in FIGS. 4 to 6 and a position in which bottom 30 is retracted part of the way to the top 32. The variable heights of the delivery chute 24 allow different sized agitators 22 to use the one agitator loading system 20. There are typically two sized agitators 22, the standard and the mini-mixer. In other embodiments of the invention, there may be more than two extended positions.

The delivery chute 24 is suspended from a plate 36, onto which gob hopper 18 is situated. The bottom 30 of the delivery chute 24 is attached to a plate and frame assembly 38. Part way along the delivery chute 24 there is attached a middle plate and frame assembly 34. Both frame assemblies 34, 38 are suspended by wire ropes 40 to a lifting assembly 42. When activated, wire ropes 40 are retracted by lifting assembly 42 and plates 34, 38 are lifted to the desired position. As the delivery chute 24 is a rubber sock, as the plates 34, 38 are lifted, the delivery chute 24 is flexible enough for the delivery chute 24 to be collapsible.

Figure 9:
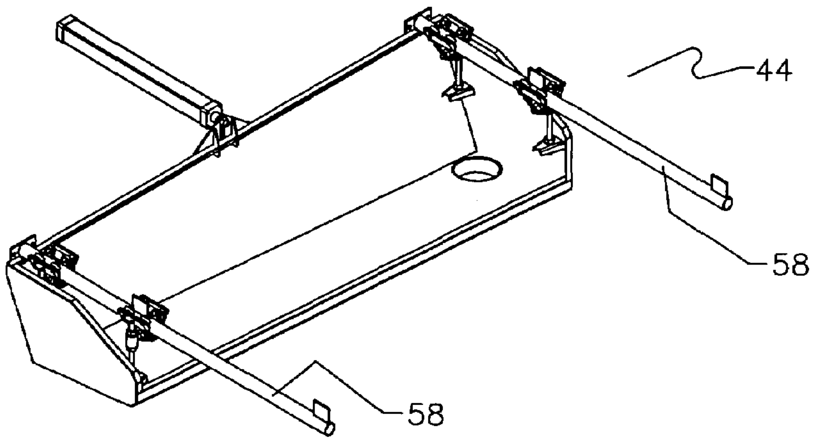
FIG. 9 shows a perspective view of a drip tray.
Figure 10:
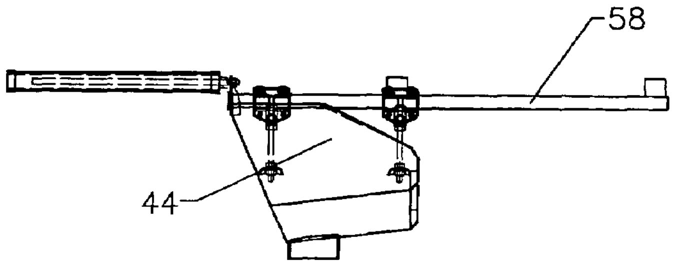
FIG. 10 shows a side view of the drip tray of FIG. 9.
Figure 11:
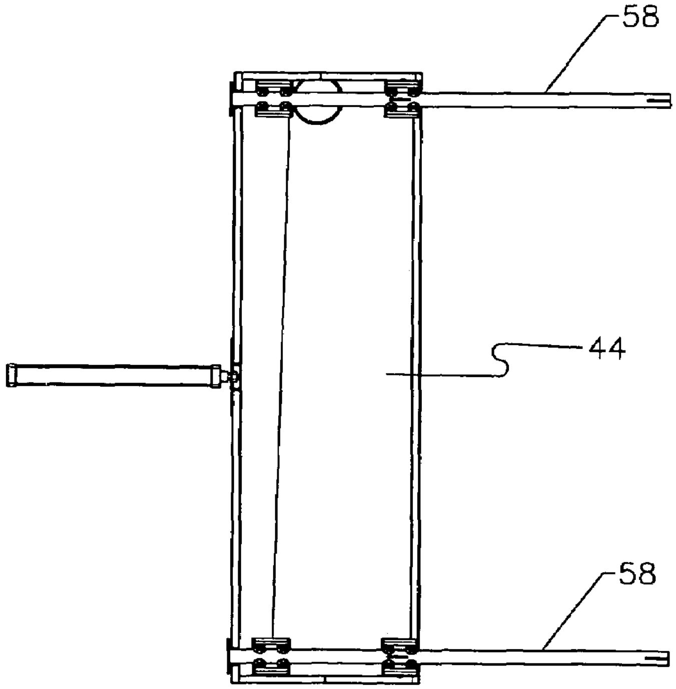
FIG. 11 shows a plan view of the drip tray of FIG. 9.

The system 20 also includes a drip tray 44, which is positioned beneath delivery chute 24 when system 20 is not in use, as shown in FIGS. 9 to 11. The drip tray 44 catches any excess mixing ingredients that may escape from the delivery chute 24 once the loading of the agitator 22 has finished. When the delivery chute 24 is required for loading of the agitator 22, the drip tray can be retracted, by sliding along rails 58, to allow the mixing ingredients to enter the inlet 28 of the agitator 22.

The dust containment apparatus 26 illustrated in FIG. 2 includes a number of different components. The dust containment apparatus 26 includes a door 46, which closes one end of the loading bay 16, closest to the delivery chute 24. The door 46 minimizes dust dispersion during agitator 22 loading and also decreases noise emissions. A second door (not shown) is located at the other end of loading bay 16 to further minimize dust dispersion and noise emissions. The doors operate vertically and therefore do not extend into or out of the loading bay 16. The doors are made of clear Perspex allowing vision into the loading bay 16 when in use.

The dust containment apparatus 26 also includes a dust hood 48, which is moveable between a retracted position and a lowered position (as shown in FIG. 2) for minimizing dust dispersion during agitator 22 loading. The dust hood 48 has a front end 49 and a rear end 51, whereby rear end 51 extends lower than front end 49. When in the lowered position, the rear end 51 of the dust hood 48 extends below the agitator inlet 28.

Figure 7:
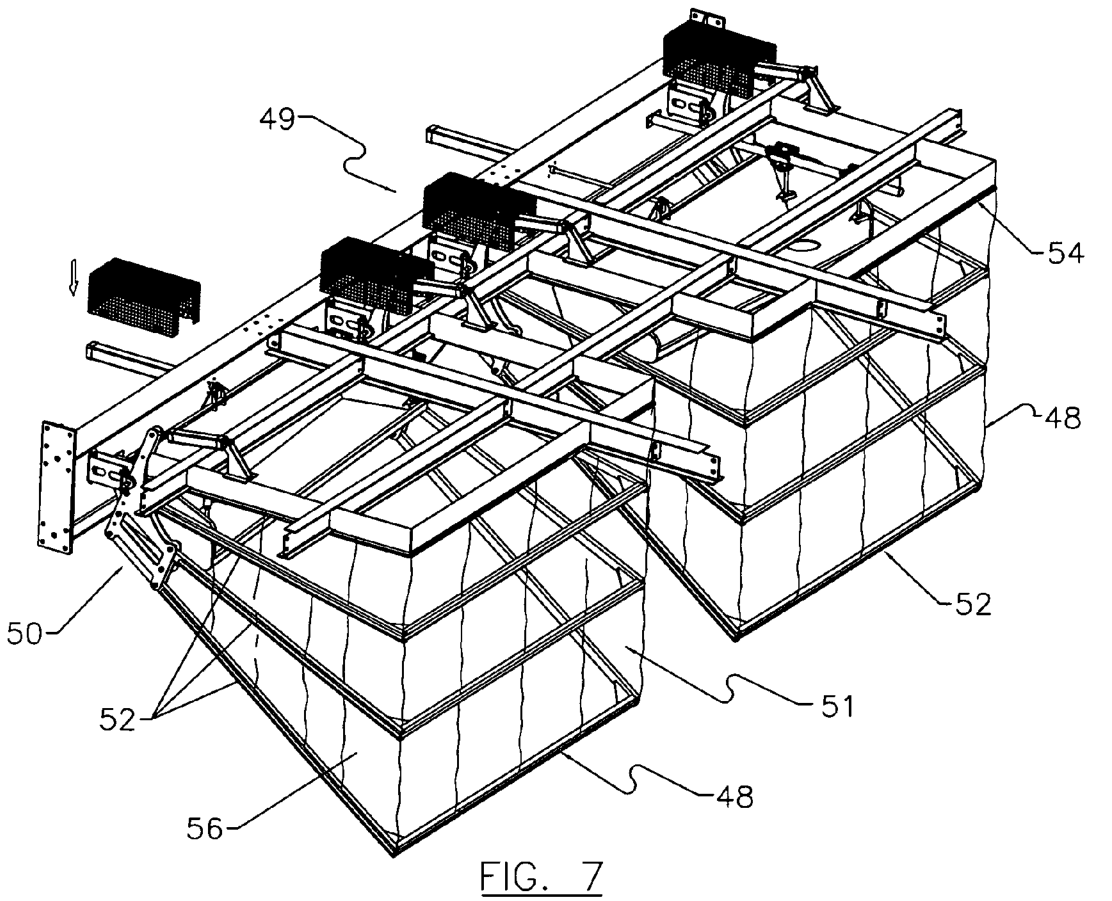
FIG. 7 shows a perspective view of a dust hood.

FIG. 7 shows two dust hoods 48 adjacent each other, each of which is installed in one of the adjacent loading bays 16. If only one loading bay 16 was present in the system 20, then only one dust hood 48 would be present. Each dust hood 48 includes a bellows mechanism 50 made up of frames 52 covered by a cover 56. The frames 52 draw together towards upper frame 54 to a retracted position to allow the agitator 22 to move into position. When the dust hood 48 is lowered, it surrounds the delivery chute 24 and the inlet 28, as shown in FIG. 2.

Figure 8:
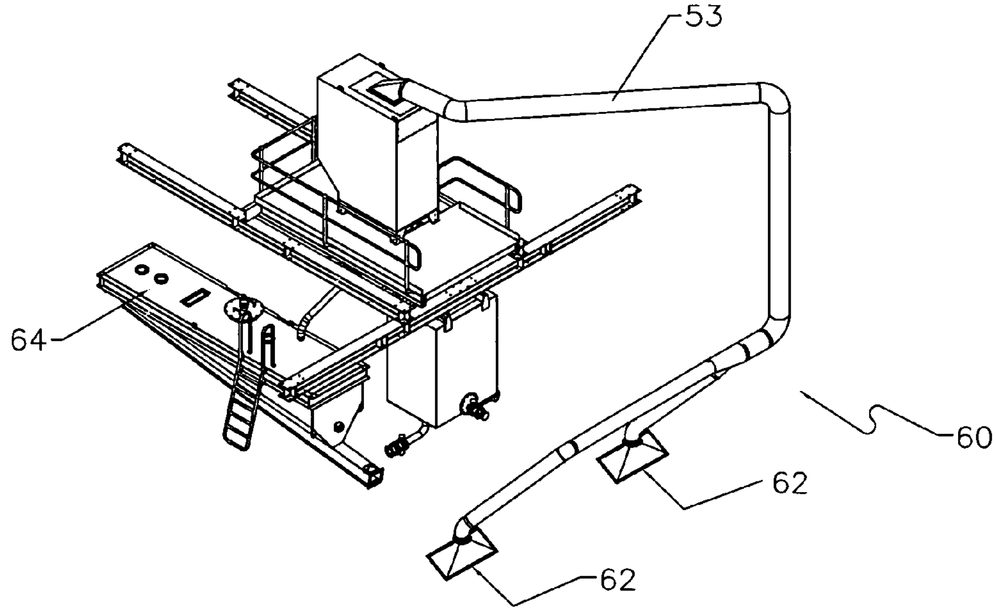
FIG. 8 shows a perspective view of an extraction system.

The dust containment apparatus 26 also includes an extractor 60, as shown in FIG. 8. As with the dust hoods 48 shown in FIG. 7, two extractor heads 62 are present, each extending into one of the adjacent loading bays 16. Extractors 60 are activated such that suction is applied to remove the dust surrounding the delivery chute 24. The extractor 60 is preferably positioned within the dust hood 48. The dust extracted during loading of the agitator 22 is drawn into pipe 53 and returned to the cement weigh hoppers 64 to be reused as a mixture ingredient.

Figure 3:
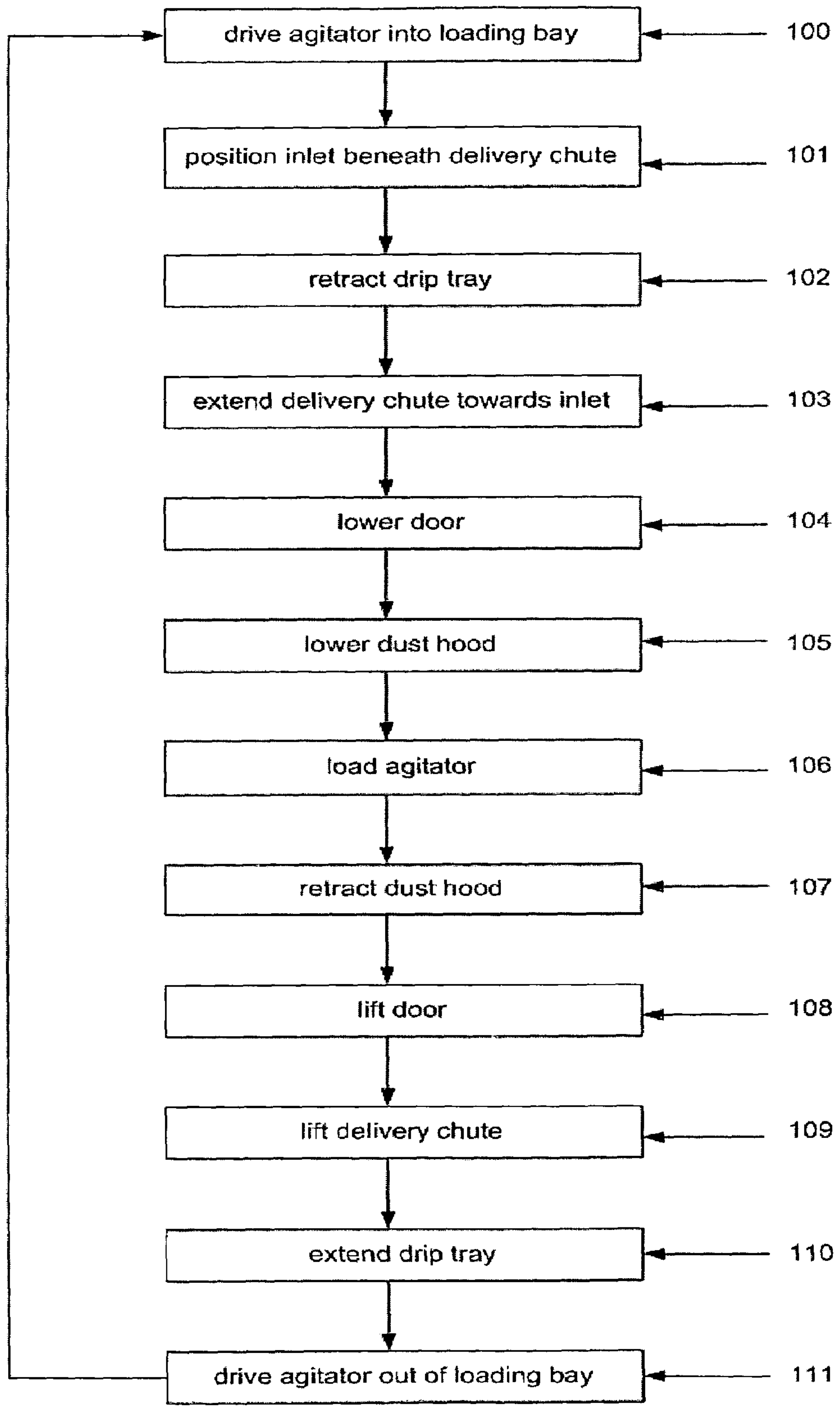
FIG. 3 shows a flow chart of the agitator loading method according to another embodiment of the present invention.

As shown by the flow chart in FIG. 3, the method for loading an agitator 22 from the system 20, is initiated, at step 100, by driving the agitator 22 into the loading bay 16 and positioning the inlet 28 on the agitator 22 beneath the delivery chute 24 in step 101. The driver of the agitator 22 then presses a button on the wall of the loading bay 16, which notifies a remote control room that the agitator 22 is in position and is ready to receive the mixture ingredients. The system 20 is fully computerized and loading of the mixture ingredients is controlled from a remote control room. However, it will be appreciated that the system 20 may be manually activated, or the control room could be contained within the loading bay 16. The control room and the driver could control separate components of the system, or they could all be controlled by either the control room or the driver.

The mixture ingredients of concrete typically include aggregate, such as sand and gravel, cement and water. Aggregate is delivered via conveyor 10 and is stored in storage hopper 66. A selected amount of aggregate is delivered into gob hopper 18, along with water from the water tank 14. Cement is weighed in weigh hopper 64, before being delivered into gob hopper 18.

Once the driver presses the button, the drip tray 44 retracts at step 102, and the delivery chute 24 is extended at step 103 towards the agitator inlet 28. The dust containment apparatus 26 is also caused to be placed in a dust containment configuration, such that the door 46 is lowered at step 104 and the dust hood 48 is lowered at step 105. The measured amount of mixture ingredients are released from the gob hopper 18 and the agitator is loaded at step 106 with the mixture ingredients through the delivery chute 24 into the inlet 28. Once loading is completed, the dust hood 48 is retracted at step 107, the door 46 is lifted at step 108 and the delivery chute 24 is lifted at step 109. The drip tray is then extended at step 110 and the agitator 22 is driven out of the delivery bay 16 at step 111.

One of the advantages of the agitator loading system 20 is the reduction in dust emissions into the surrounding environment. The system is efficient and increases batching times and the drive through loading bays increase traffic flow within the plant and reduce traffic management issues.

It will be understood that the invention disclosed and defined in this specification extends to all alternative combinations of two or more of the individual features mentioned or evident from the text or drawings. All of these different combinations constitute various alternative aspects of the invention.

Although the present invention has been described with reference to preferred embodiments, workers skilled in the art will recognize that changes may be made in form and detail without departing from the spirit and scope of the invention.

What is claimed is:

1. An agitator loading system, including:

a loading bay;

a delivery chute for delivering mixture ingredients from a storage area to an agitator, which delivery chute comprises a longitudinally collapsible tubular sock attached at a bottom end and at an intermediate position to respective frame assemblies each suspended by a respective set of wire ropes from lifting means which is operable to lower and raise the frame assemblies between a fully retracted position of the chute and a fully extended position of the chute or a position in which said bottom end of the chute is partly retracted from said fully extended position; and a dust containment apparatus for minimizing the dust dispersion during agitator loading.

2. A system according to claim 1 and further including a drip tray.

3. A system according to claim 2, wherein the drip tray is moveable between an extended position beneath the delivery chute and a retracted position during agitator loading.

4. A system according to claim 1, wherein the dust containment apparatus includes a door for closing one end of the loading bay.

5. A system according to claim 4 wherein the door is operable vertically and does not extend into or out of the loading bay.

6. A system according to claim 5 wherein the door is transparent to an extent to allow vision into the loading bay when the door is closed.

7. A system according to claim 1, wherein the loading bay is a drive through loading bay and the dust containment apparatus includes two doors for closing both ends of the loading bay.

8. A system according to claim 7, wherein the dust containment apparatus includes a dust hood.

9. A system according to claim 8, wherein the dust hood is moveable between a retracted position and a lowered position for minimizing dust dispersion during agitator loading.

10. A system according to claim 9, wherein the dust hood extends below an outlet of the delivery chute when in the lowered position.

11. A system according to claim 7 wherein each door is operable vertically and does not extend into or out of the loading bay.

12. A system according to claim 11 wherein each door is transparent to an extent to allow vision into the loading bay when the door is closed.

13. A system according to claim 1, wherein the dust containment apparatus includes an extractor.

14. A system according to claim 13, wherein the dust containment apparatus includes a dust hood and the extractor extends within the dust hood.

15. An agitator loading system, comprising:

a drive through loading bay;

a delivery chute for delivering mixture ingredients from a storage area to an agitator, which delivery chute comprises a longitudinally collapsible tubular sock and lifting means operable to lower and raise the chute between a fully retracted position of the chute and one or more extended positions of the chute; and a dust containment apparatus for minimizing the dust dispersion during agitator loading which dust containment apparatus includes a dust hood and two doors for closing both ends of the loading bay, wherein each door is transparent to an extent to allow vision into the loading bay when the door is closed, is operable vertically and does not extend into or out of the loading bay.

16. A system according to claim 15, wherein the delivery chute has two extended positions at two different heights below the storage area.

17. An agitator loading system according to claim 16 wherein said delivery chute is attached at a bottom end and at an intermediate position to respective frame assemblies each suspended by a respective set of wire ropes from said lifting means.

18. A system according to claim 15 and further including a drip tray.

19. A system according to claim 18, wherein the drip tray is moveable between an extended position beneath the delivery chute and a retracted position during agitator loading.

20. A system according to claim 15, wherein the dust hood is moveable between a retracted position and a lowered position for minimizing dust dispersion during agitator loading.

21. A system according to claim 20, wherein the dust hood extends below an outlet of the delivery chute when in the lowered position.

* * * * *